C. G. EADES.
DIRIGIBLE HEADLIGHT.
APPLICATION FILED FEB. 19, 1916.

1,201,278.

Patented Oct. 17, 1916.
3 SHEETS—SHEET 1.

WITNESS
Charles J. Diller.

INVENTOR
Carl G. Eades.
BY
ATTORNEY

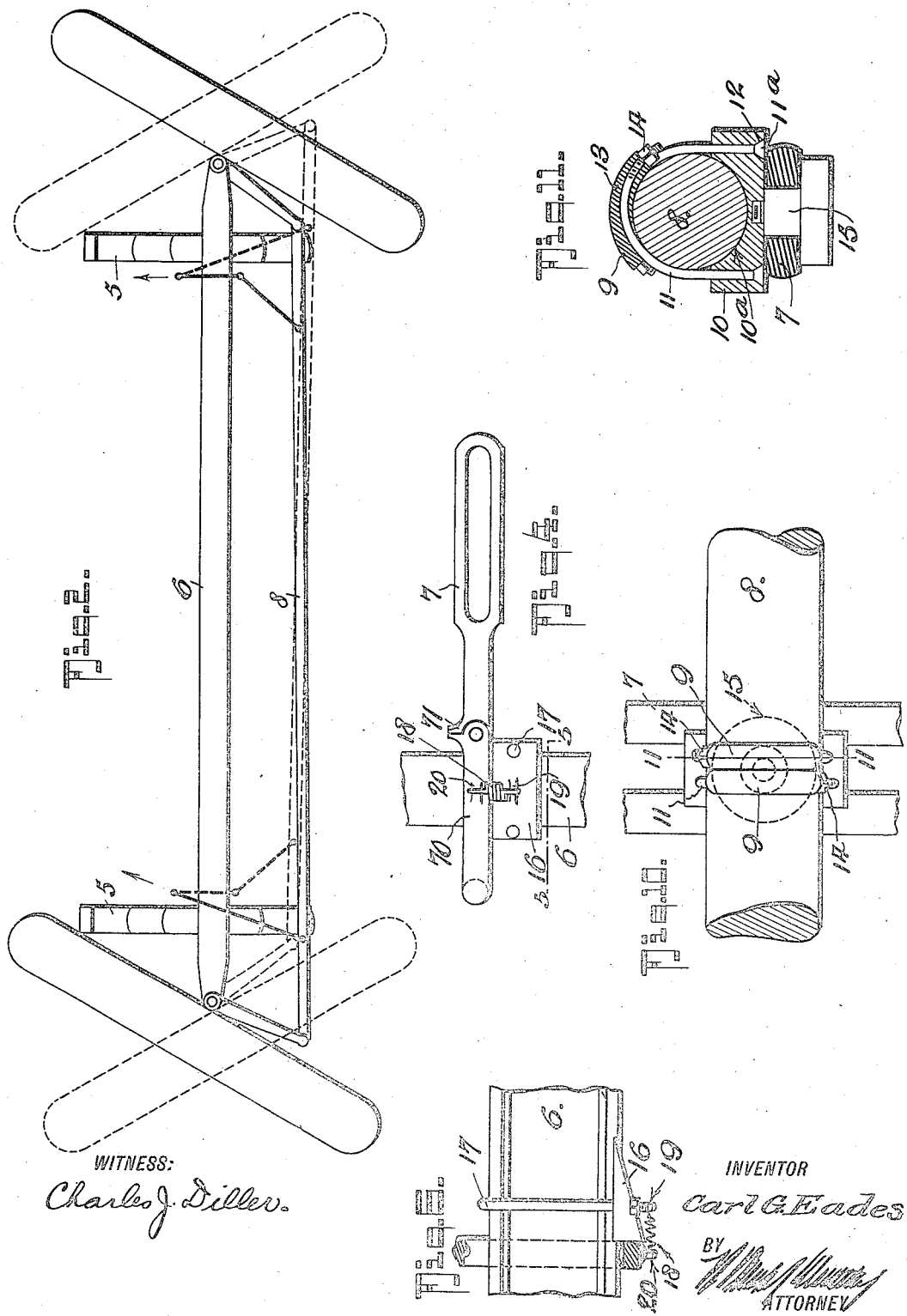

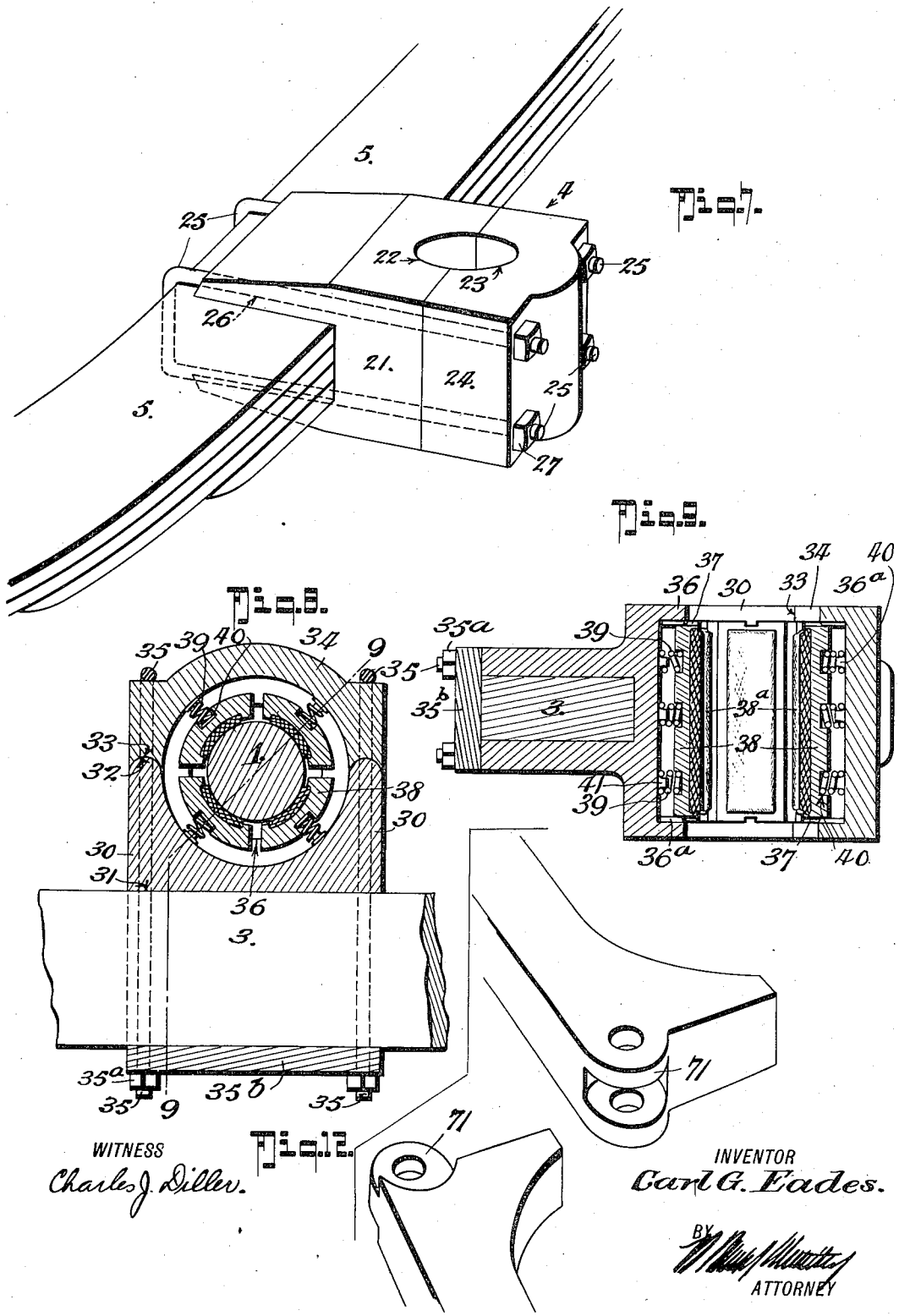

UNITED STATES PATENT OFFICE.

CARL GRADY EADES, OF LOWELL, WEST VIRGINIA, ASSIGNOR OF ONE-HALF TO ROBERT F. DUNLAP, OF HINTON, WEST VIRGINIA.

DIRIGIBLE HEADLIGHT.

1,201,278.  Specification of Letters Patent.  Patented Oct. 17, 1916.

Application filed February 19, 1916. Serial No. 79,321.

*To all whom it may concern:*

Be it known that I, CARL G. EADES, residing at Lowell, in the county of Summers and State of West Virginia, have invented a new and Improved Dirigible Headlight, of which the following is a specification.

My invention has reference to improvement in controlling means applied to automobiles for automatically directing the head lights as the machine passes around curves and it primarily seeks to provide auto-vehicle head light controlling means, of a simple and economical construction and in which the action of adjusting the head lights is entirely automatic.

In its more specific nature, my invention seeks to provide an improved mechanism, of the general character stated, in which the head light controlling devices are especially designed for causing the light at that side, opposite to the curve on which the machine is traveling, to so rotate or adjust itself to direct the lamp rays at that side to follow the line of curve, while the light at the other side of the machine remains at its straight ahead or normal position, the relative positioning of the two lamps shifting in either direction to follow a right or left hand curve.

A further object of my invention is to provide an automobile head-light controlling mechanism, in which the several parts are operatively so arranged and adapted for being readily applied to any of the well known types of automobile chassis, without requiring any material change in their structure.

In its still more subordinate nature, my invention has for its purpose to provide certain improvements in headlight controlling means for motor vehicles in which is included, in connection with the lamp spindles or standards, and the steering rod, devices coöperatively connected with the said steering rod or bar and the machine chassis, which, while effecting the desired rotation of the lamp standards or spindles in accordance with the transverse movement of the steering rod, also provide for the vertical movement of the lamp when the springs are compressed as the machine travels over rough ground, and which also tend to hold the said lamp spindles steady and from rattling during the travel of the machine.

Figure 1:
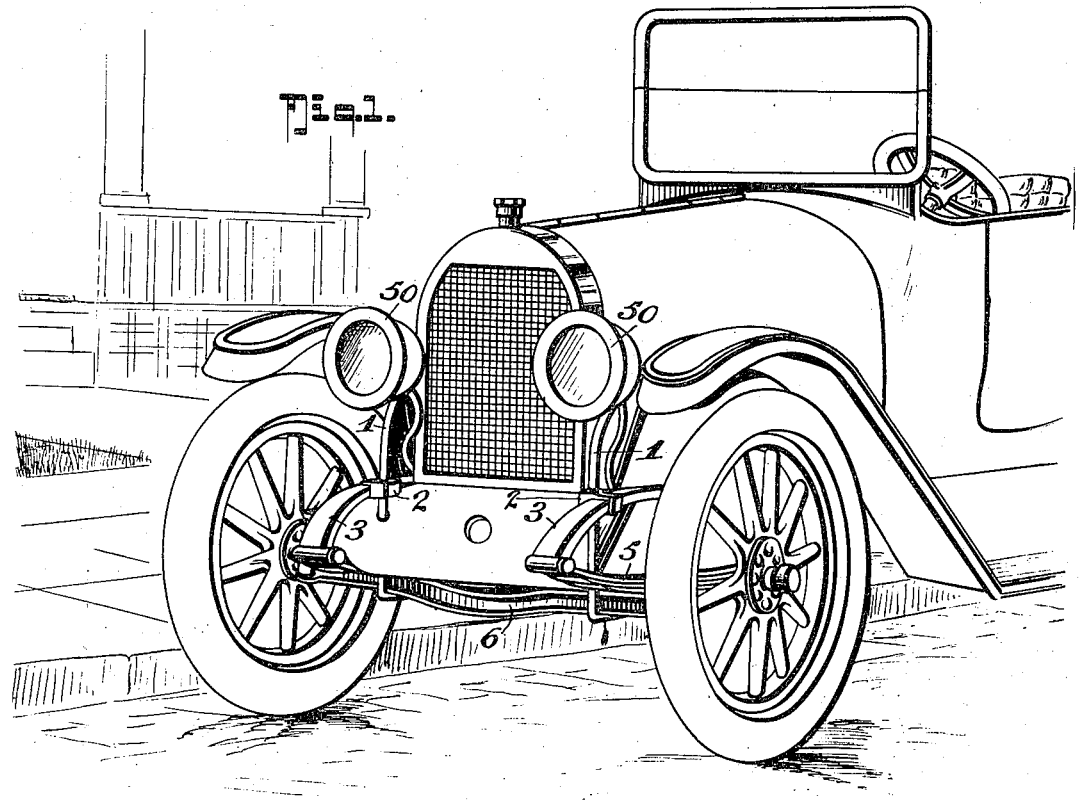
Figures 3, 5:
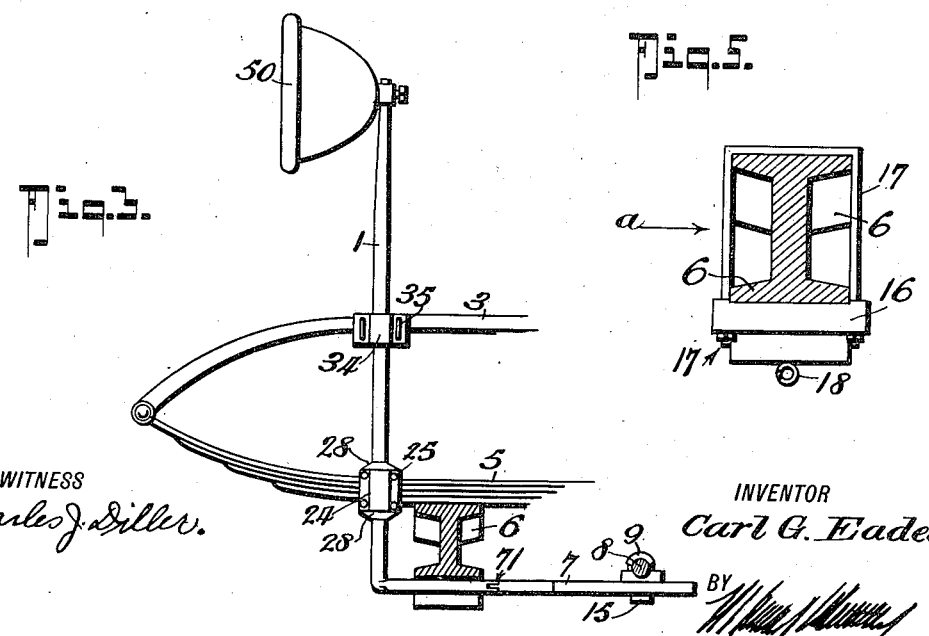

With the above and other objects in view, that will hereinafter appear, my invention consists in the peculiar combination and novel arrangement of the parts hereinafter explained, specifically pointed out in the appended claims and illustrated in the accompanying drawings, in which:

Figure 1 is a perspective view of my invention, so much of an automobile structure being shown necessary to illustrate a practical application thereof. Fig. 2 is a diagrammatic plan view of the front or steering gear of an auto-vehicle, with my light control mechanism combined therewith, the position of the headlights, when the machine is taking a right curve, being indicated in full lines and when taking a left hand curve, indicated in dotted lines. Fig. 3 is a side elevation of a part of the chassis frame, a spring member, the front axle, the steering bar, one of the lamp standards or spindles, the upper and lower bearing sockets therefor, and the coupling device that joins the said lamp standard or spindle to the steering rod or bar. Fig. 4 is a bottom plan view of a portion of the front axle, one of the lamp spindles or standards, with its slotted and jointed crank member, and one of the abutment members on the axle, hereinafter specifically referred to. Fig. 5 is a cross section thereof on the line 5—5 on Fig. 4. Fig. 6 is a detail side elevation thereof looking in the direction of the arrow *a* on Fig. 5. Fig. 7 is a perspective view of one of the lower socket bearings for the lamp standards. Fig. 8 is a horizontal section of one of the upper socket bearings for the lamp standards. Fig. 9 is a vertical section thereof on the line 9—9, see Fig. 8. Fig. 10 is a plan view of one of the clip connections that join the slotted crank end of the lamp standards or spindles with the steering bar. Fig. 11 is a cross section thereof on the line 11—11 on Fig. 10, and Fig. 12 is a detail view of one of the rule joint connections of the two members that constitute the longitudinally slotted crank ends of the lamp standards or spindles.

In the drawings, I have shown a practical embodiment of my invention as applied to a conventional arrangement of certain parts of the framing and the steering mechanism for the ordinary styles of automobiles, it being understood that in the details of structure my improved appliances are capable of such modifications to adapt them for being applied to the general run of motor vehicle frames without the need of making any material change in the structure thereof.

In carrying out my invention, the opposite lamp standards 1—1 are mounted in upper and lower bearing sockets, the upper ones 2 of which are attached to the spring supporting member 3 of the chassis and the lower ones 4, (the special construction of which and the upper sockets will be hereinafter fully explained) are attached to the springs 5, at a point in advance of the front axle 6, by reference to which it will be seen the lower end of the lamp standard or spindle terminates in a horizontal crank portion that passes back under the front axle and is joined with the steering bar or rod 8 by a clip connection 9 of the special construction hereinafter explained.

The crank portion of the lamp spindle or standard includes a longitudinally slotted arm 7 that is hingedly connected with the short crank end 70, integral with the lower end of the standard, the said connection being in the nature of a rule joint 71 arranged to permit the slotted arms 7 to swing freely in one direction, to provide for movement of the said arms 7 without effecting rotation of their respective lamp standards as will presently more fully appear.

The clip connection 9 before referred to and shown in detail in Figs. 10 and 11 consists of a plate 10 that has a concaved seat 10ª to snugly fit against the underside of the steering bar 8, to which it is firmly clamped by bent clip bolts 11 having countersunk heads 11ª for engaging the countersunk seats 12 in the plate 10. The threaded ends of the bolts 11 pass crosswise through a clip lug 13 and are secured by the nuts 14 as shown.

15 designates a beaded screw stud that takes through the slot arm 7, and threads into the plate 10 as shown.

16—16 designate a pair of abutment plates secured upon the front axle, one adjacent to and adapted to coöperate with the short rigid crank members integral with the lower ends of the lamp standards or spindles, and each of the said abutments is in the nature of a wedge shaped block that is clamped on the under side of the axle by ∩ clips and bolts 17.

18 designates a coiled spring, one end of which is fastened to an eye 19 on the plate 16, and the other end to a pendent eye 20 on the short crank member and the said springs tend to hold their respective crank members up solid against their respective abutments 16, to thereby hold the lamp spindles with their lamps to the normal or straight ahead position, it being apparent, by referring to Fig. 6, that since the short crank members of the lamp spindles are drawn tightly against the abutments 16, the bevel on the said abutments serves to hold them securely clamped on to the axle.

The lower bearings for the lamp spindles or standards, one of which is shown in detail, Fig. 7, consists of a bifurcated block 21 that projects on to the edge of the spring member 5, and has the front or outer face formed with a vertical concaved seat 22, that co-acts with a like seat 23 in an outer block 24 that is clamped against the block 21 by the clip bolts 25 that take around the spring 5, that pass through apertures 26 in the blocks 21, 24 and secured by the nuts 27 as shown.

That part of the lamp spindle that passes through the lower bearing has a pair of opposing annular flanges 28—28 that form rigid seats for engaging the upper and lower faces of the said lower bearing, and to prevent vertical play or rattling of the said spindle in the said lower bearing.

The upper bearings for the lamp spindle, one of which is shown in detail, Figs. 8 and 9, comprises a block 30 having a transverse recess 31 to fit on to the frame member 3 and a vertical concaved seat 32 that forms the companion of a similar vertical seat 33 in a supplemental block member 34, that is held up to the block 30 by clamp bails 35 that take over the member 3 and pass through the two block members 34 and 30 and a clip plate 35ᵇ as shown.

The block members 30 and 34 include upper and lower inwardly projected flanges 36, each of which has a series of radial ribs 36ª on their inner face, that form guides for engaging guide grooves 37—37 in the upper and lower edges of segmental clamp plates 38, having padded faces 38ª that take up excess oil and yieldingly engage the lamp spindle, and are held in operative position by a set of coiled springs 39 that engage sockets 40 in the back of the plates 38 and rest on the inner faces of the studs 34ª on the blocks 30 and 34.

By reason of the construction of the upper and lower bearings for the lamp spindles, simple and effective provision is provided for properly supporting the said spindles and allow for vertical play thereof in the upper brackets as the front springs compress and expand when passing over rough places, and since the segmental plates 38, that engage the spindles, are yieldably mounted in the manner stated and shown, danger of the spindles binding within the said upper bearings is entirely overcome and rattling of the parts is avoided and the said plates also at the same time serve as spindle lubricators and silencers.

The lamps 50 are detachably held on the upper end of their respective spindles in any suitable manner so as to turn with the spindle.

From the foregoing taken in connection with the accompanying drawings, the complete construction and the advantages of my invention will be readily apparent.

In the practical operation, as the car approaches a curve, that bears to the right, the operator in directing the car around such curve, through the steering gear, forces the steering rod 8 (see Fig. 2) to the left and in to the position indicated in full lines, and in thus shifting it moves the crank end of the head light spindle at the left, the slotted member and the inner crank portion of the said spindle, now moving as one, and thereby rotating the said spindle with the lamp thereon to the right until the light rays fall in the same general direction in which the car is being driven.

At the same time, the slotted member of the crank end of the spindle that carries the other light (at the right) by reason of its rule joint connection with the rigid crank portion, will be swung freely to the left as shown without effecting rotation of the spindle or standard of the "left" lamp, the rays from which during the turn to left, remain straight ahead.

When the car is being driven on a curve bearing to the left, the same principle of adjustment of the parts apply as indicated in dotted lines on Fig. 2, the lamp at the left now remaining stationary to direct the rays straight ahead while the lamp at the right is turned to direct the rays along the curve to the left.

What I claim is:

1. In a head-light controlling mechanism for vehicles; the combination with a pair of oppositely positioned rotary head-light carrying standards or spindles and the steering gear of the vehicle; of means connecting the aforesaid parts for turning one of the said head-lights to follow the curve on which the vehicle is directed, and at the same time hold the other head-light to its normal position, the said means including a connecting member for each head-light standard having a rule joint and stop members on the vehicle gear engaged by the said connecting members to hold one of the said members from rotation as the other is being rotated under the shifting action of the steering gear.

2. In a headlight controlling mechanism, the combination with the vehicle axle and a shiftable steering bar; of a pair of oppositely positioned rotary headlight carrying standards whose lower ends terminate in crank portions that extend under and to the rear of the axle, stop members on the axle, one for each standard crank member, means connected to each crank member and to the axle, tending to normally pull the crank members against their respective stops, a link member for each crank portion, said link members being connected to the steering bar and having a rule joint connection with their respective crank portions, whereby as the steering bar is shifted in one direction one of the crank portions with its respective standard is turned in one direction and the other crank portion with its respective standard is held to its normal position.

3. In a head-light controlling mechanism for vehicles, the combination with the vehicle frame including the spring and the spring supporting member, a socket bearing on the spring, another socket bearing on the spring supporting member, a lamp carrying standard rotatably mounted within the said socket bearings and having vertical movement in the bearing on the spring supporting member; means for turning the said lamp carrying standard with its headlight from its normal position, the socket on the spring supporting member including segmental yieldably held members for frictionally engaging the standard to hold it from loose play or rattling.

4. In a headlight controlling mechanism for motor vehicles, the combination with the vehicle frame which includes the spring and the spring supporting member, a bearing secured to the spring, another bearing secured to the supporting member, a lamp carrying standard rotatably mounted in the said bearings and having vertical movement in the bearing that is attached to the spring supporting member, said last named bearing consisting of two opposing concaved sections, each of which includes upper and lower inwardly projecting annular flanges whose inner faces have radial grooves, segmental members located within the concavities of the two opposing sections, means connected to said segmental members and the two opposing concaved sections for yieldably supporting the segmental members, the said segmental members including guides for engaging the radial grooves in the aforesaid annular flanges, said segmental members being arranged to engage the lamp standard to hold it from loose play or rattling.

5. In a headlight controlling mechanism for vehicles, the combination with a spring and a spring support, of spindle bearings mounted on the spring and spring support, a headlight carrying standard or spindle mounted in the said bearings, means co-operative with the bearing on the spring for holding said spindle against longitudinal movement in the spring bearing, said spindle having longitudinal movement in the spring support bearing, an anti-rattling device in said spring support bearing for engaging said spindle, and a coöperative connection between said spindle and the steering gear for turning said spindle on its longitudinal axis.

6. In a headlight controlling mechanism for vehicles, the combination with a spring and a spring support, of spindle bearings mounted on the spring and spring support, a headlight carrying standard or spindle mounted in the said bearings, means coöperative with the bearing on the spring for holding said spindle against longitudinal movement in the spring support bearing, an anti-rattling device in said spring support bearing for engaging said spindle, a coöperative connection between said spindle and the steering gear for turning said spindle on its longitudinal axis, said coöperative connection including a crank arm on said spindle, said crank including a one-way hinge or rule joint, and means connecting said crank arm to the cross connecting rod of the steering gear.

CARL GRADY EADES.